No. 732,567. PATENTED JUNE 30, 1903.
G. F. LASHER.
MARINE ENGINE GOVERNOR.
APPLICATION FILED JUNE 12, 1902.
NO MODEL. 2 SHEETS—SHEET 2.
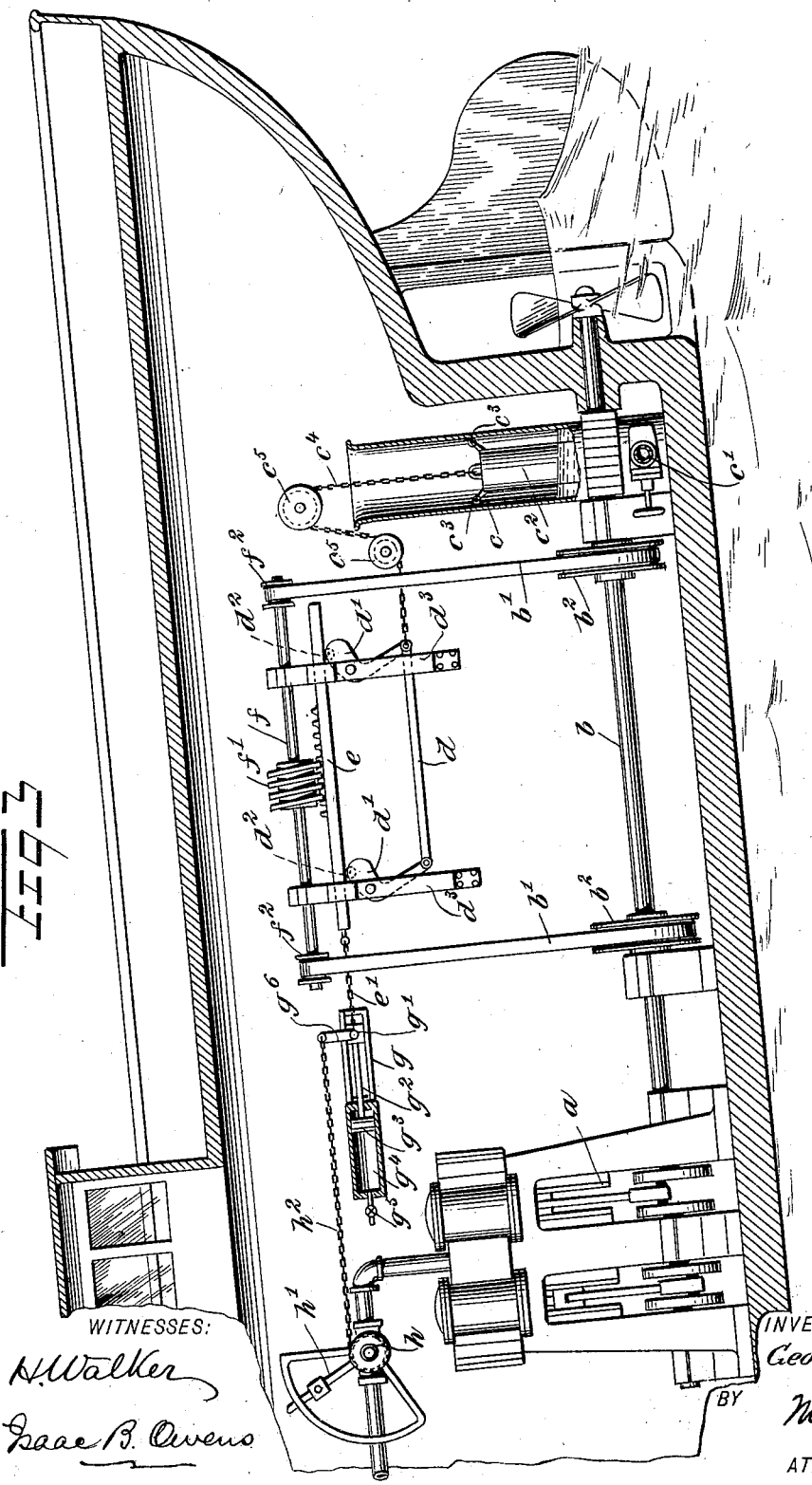
WITNESSES:
H. Walker
Isaac B. Owens
INVENTOR
George F. Lasher
BY
ATTORNEYS.

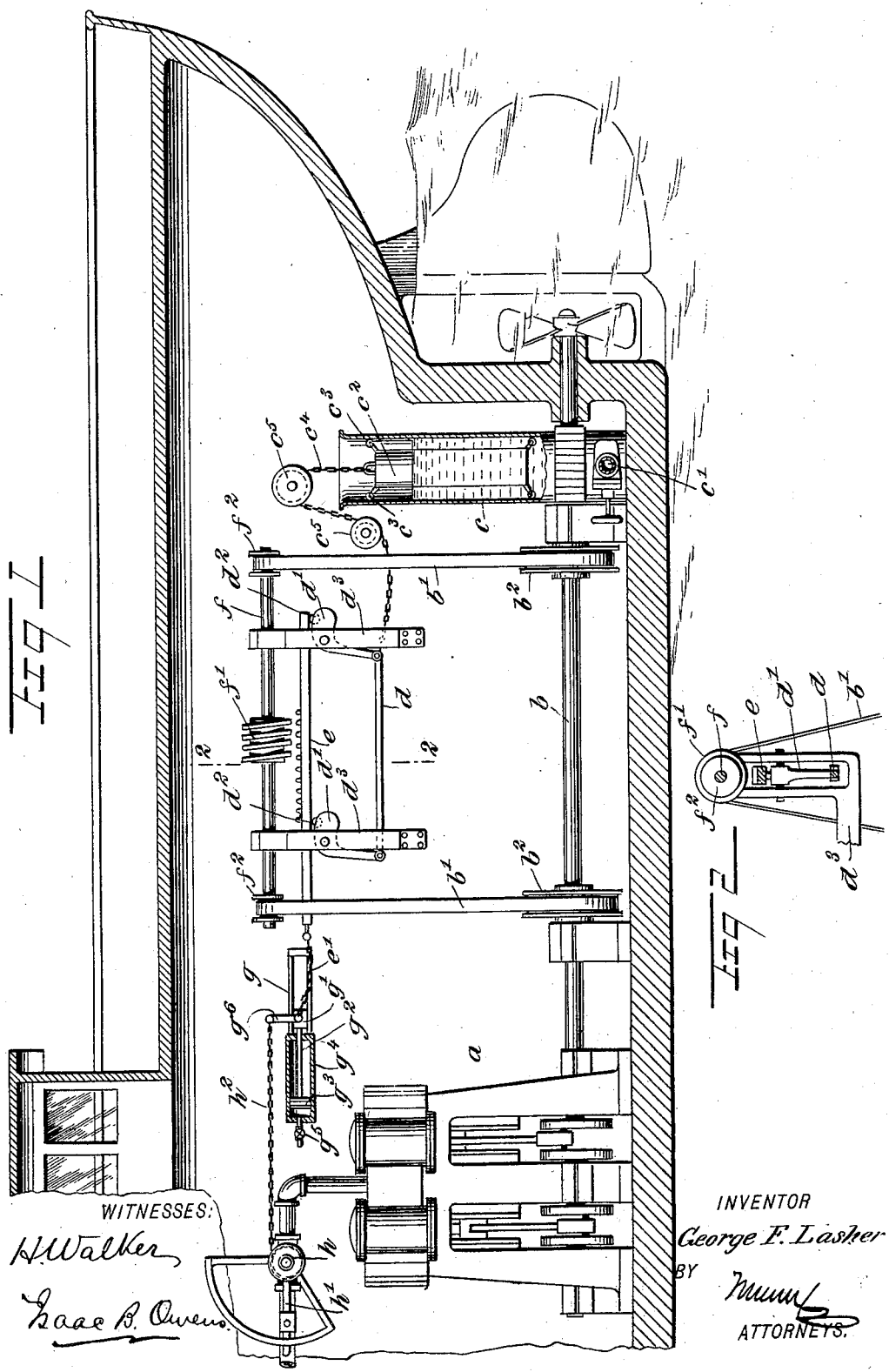

No. 732,567. Patented June 30, 1903.

UNITED STATES PATENT OFFICE.

GEORGE FRANKLIN LASHER, OF PORTLAND, OREGON, ASSIGNOR OF ONE-HALF TO ISAAC B. HOLZMAN, OF PORTLAND, OREGON.

MARINE-ENGINE GOVERNOR.

SPECIFICATION forming part of Letters Patent No. 732,567, dated June 30, 1903.

Application filed June 12, 1902. Serial No. 111,329. (No model.)

*To all whom it may concern:*

Be it known that I, GEORGE FRANKLIN LASHER, a citizen of the United States, and a resident of Portland, in the county of Multnomah and State of Oregon, have invented a new and Improved Marine-Engine Governor, of which the following is a full, clear, and exact description.

This invention relates to a marine-engine governor of that class which seeks to throttle the engine as the stern of the vessel heaves, thus preventing the screw racing in the air.

The apparatus comprises a float which works in a stand-pipe built in the hull of the vessel immediately contiguous to the stern. This float has connection with a cam which is actuated as the float falls in the stand-pipe, the cam throwing up a rack and causing it to mesh with a continuously-driven worm, whereby the rack is moved longitudinally, and through a connection between the rack and the throttle the speed of the engine is decreased, according to the extent of the movement of the rack.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a sectional view of the invention, showing the parts in normal position. Fig. 2 is a detail cross-section on the line 2 2 of Fig. 1, and Fig. 3 is a view showing the stern of the vessel raised out of the water and illustrating the action of the apparatus to throttle the engine.

$a$ indicates the engine, and $b$ the propeller-shaft. In the hull of the vessel immediately contiguous to the stern is constructed a stand-pipe $c$, the bottom of which is open, so as to communicate directly with the water, and the upper end of which rises above the highest water-line of the vessel and is open, as shown. The stand-pipe $c$ may, if desired, be fitted with a sea-cock $c'$, to be used in the ordinary manner.

$c^2$ indicates the float, which is fitted with antifriction-rollers $c^3$, guiding it in its vertical movement in the stand-pipe. Connected with the float $c^2$ is a chain $c^4$, which runs over guide-sheaves $c^5$ and has connection with a link $d$, which is in turn connected to the long arms of elbow-cams $d'$. These cams $d'$ carry antifriction-rollers $d^2$ on their working surfaces, and such rollers are engaged with a rack $e$, which is held to reciprocate longitudinally in bracket-like frames $d^3$, such frames being thus to carry the cams $d'$. The frames $d^3$ also carry a rotary shaft $f$, on which is fastened a worm $f'$, adapted to mesh with the rack $e$ when said rack is raised, as shown in Fig. 3. When the parts are at rest, however, the elements $e$ and $f'$ are disengaged, as shown in Fig. 1. The shaft $f$ carries band-pulleys $f^2$, and over these pulleys run belts $b'$, passing down around band-pulleys $b^2$ on shaft $b$.

$g$ indicates a stationary guideway, and in this guideway is arranged a slide $g'$, which is connected with the rack $e$ by a chain $e'$. The slide $g'$ carries a rod $g^2$, to which is fixed a piston $g^3$, working in an air-cylinder $g^4$, and this air-cylinder is fitted with a valve-controlled device $g^5$. As the rack $e$ moves sternward it drives with it the slide $g'$ and piston $g^3$, and by regulating the size of the vent $g^5$ the resistance to the rearward movement of the piston $g^3$ may be increased or diminished at will. By these means the apparatus may be adjusted to work as desired.

$h$ indicates the throttle-valve of the engine, and $h'$ indicates a weighted arm attached thereto, holding it normally in the open position shown in Fig. 1. This valve is connected by a chain $h^2$ with an arm $g^6$ on the slide $g'$.

In the ordinary operation of the apparatus the parts assume the position shown in Fig. 1—that is to say, the float $c^2$ is elevated in the stand-pipe and the rack $e$ is allowed to drop to its lower or inactive position. The weighted arm $h'$ holds the throttle-valve open and the engine operates unrestrainedly, except by such controlling means as are under the direct care of the engineer. Should the vessel raise her stern out of the water, exposing the propeller and endangering racing of the engine, the float $c^2$ will drop in the stand-pipe in exact proportion to the height to which the vessel's stern is raised. This will tighten the chain $c^4$, and by the action of the cams $d'$ the rack $e$ will be raised into mesh with the continuously-turning worm $f'$. This worm will draw the rack sternward and the slide $g'$ will be actuated, thus drawing on the chain $h^2$ and closing or partly closing the throttle, according to the distance to which the float $c^2$ falls. As soon as the vessel resumes her normal position the chains $c^4$ and $h^2$ are slackened and the parts all return to the inactive position shown in Fig. 1.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A marine-engine governor, comprising a stand-pipe in the vessel, a float working in the stand-pipe, a driven gear, a gear normally disengaged from the first-named gear, and capable of meshing therewith, means for moving the second gear into mesh with the first-named gear and actuated from the said float, and a connection between the second-named gear and the engine.

2. A marine-engine governor, comprising a stand-pipe in the vessel, a float working in the stand-pipe, a driven member, a second member normally disengaged from the said driven member and movable into engagement therewith, cams actuated from the float for moving the second member into engagement with the driven member, and a connection between the second-named member and the engine.

3. In a marine-engine governor, the combination with the controlling means, of a continuously-driven gear, a gear normally disengaged from the first-named gear and capable of meshing therewith, means for moving the second gear into mesh with the first-named gear, said means being actuated by the said controlling means, and a connection between the second-named gear and the engine.

4. In a marine-engine governor, the combination with the controlling means, of a continuously-driven gear, a gear normally disengaged from the first-named gear and capable of meshing therewith, means for moving the second gear into mesh with the first-named gear, said means being actuated by the said controlling means, and a connection between the second-named gear and the engine, said means for moving the second-named gear into mesh comprising a pivoted cam working against the second-named gear.

5. In a marine-engine governor, the combination with the controlling means, of a continuously-driven worm, a rack movable laterally and longitudinally, said rack being normally disengaged from the worm, means connected with the controlling means for moving the rack laterally into mesh with the worm, and a connection between the rack and the engine.

6. In a marine-engine governor, the combination with the controlling means, of a continuously-driven worm, a rack movable laterally and longitudinally, said rack being normally disengaged from the worm, means connected with the controlling means for moving the rack laterally into mesh with the worm, and a connection between the rack and the engine, said controlling means comprising a stand-pipe rising from the bottom of the vessel and a float working in the stand-pipe.

7. In a marine-engine governor, the combination with the controlling means, of a continuously-driven worm operated from the propeller-shaft, a laterally and longitudinally driven rack, a cam in connection with the controlling means and actuated thereby, the said cam serving to move the rack sidewise to mesh it with the worm, and a connection between the rack and the engine.

8. In a marine-engine governor, the combination with the throttle of the engine, and means for normally holding the throttle open, of a controlling means, a driven member, a member normally disengaged from the driven member, a connection between the said normally disengaged member and the throttle, and means connected with the controlling means for moving the said member into engagement with the said driven member.

9. In a marine-engine governor, the combination with the throttle of the engine, of means for normally holding the throttle open, a controlling means, a rack, means for driving the same, means actuated by the controlling means for moving the rack into engagement with the driving means, and a connection between the rack and the throttle to move the latter, as set forth.

10. In a marine-engine governor, the combination with the controlling means, of a driven member, a member normally disengaged from the driven member and movable into engagement therewith by the movement of the controlling means, an air-cylinder having a vent, a piston working in the cylinder, a connection between the piston and the normally disengaged member, and a connection between the piston and the throttle of the engine.

11. A marine-engine governor, comprising a stand-pipe in the vessel, a float working in the stand-pipe, an air-cylinder having a vent, a piston working in said cylinder, a connection between the piston and the engine, and a connection between the float and said piston.

12. In a marine-engine governor, the combination with the controlling means, of a shaft driven from the propeller-shaft, a gear on said shaft, a rack movable into mesh with said gear, means for moving the rack into mesh with the gear and actuated by the controlling means, and a connection between the rack and the engine.

13. In a marine-engine governor, the combination with a stand-pipe in the vessel, of a float working in said stand-pipe, a driven worm, a rack normally disengaged from the worm and adapted to be moved into mesh therewith, cams for moving the said rack into mesh with the worm, a link connecting the cams, a connection between the said link and the float, and a connection between the said rack and the throttle of the engine.

In testimony whereof I have signed my name to this specification in the presence of two subscribing witnesses.

GEORGE FRANKLIN LASHER.

Witnesses:
E. E. MERGES,
T. W. ENOS.